(12) United States Patent
Brickner-McDonald

(10) Patent No.: US 11,840,813 B2
(45) Date of Patent: Dec. 12, 2023

(54) GROUND SUPPORT EQUIPMENT (GSE) BAGGAGE CART FOREIGN OBJECT DEBRIS (FOD) REMOVAL SWEEPING MECHANISM

(71) Applicant: Ryland Brickner-McDonald, Mountain Lakes, NJ (US)

(72) Inventor: Ryland Brickner-McDonald, Mountain Lakes, NJ (US)

( * ) Notice: Subject to any disclaimer, the term of this patent is extended or adjusted under 35 U.S.C. 154(b) by 168 days.

(21) Appl. No.: 17/581,921

(22) Filed: Jan. 22, 2022

(65) Prior Publication Data

US 2022/0307210 A1     Sep. 29, 2022

Related U.S. Application Data

(60) Provisional application No. 63/165,043, filed on Mar. 23, 2021.

(51) Int. Cl.
*E01H 1/04* (2006.01)
*B64F 1/36* (2017.01)

(52) U.S. Cl.
CPC .............. *E01H 1/047* (2013.01); *B64F 1/368* (2013.01)

(58) Field of Classification Search
CPC ......................... E01H 1/04–1/047; B64F 1/368
See application file for complete search history.

(56) References Cited

U.S. PATENT DOCUMENTS

| 4,069,929 A | 1/1978 | Harker |
| 10,815,629 B2 | 10/2020 | Goedkin et al. |
| 2013/0322994 A1 | 12/2013 | Curotto et al. |

*Primary Examiner* — Andrew A Horton

(57) ABSTRACT

A mechanical sweeping mechanism removably affixed to existing ground service equipment (GSE) for the collection and removal of foreign object debris (FOD) in a removable hopper. Movement of a GSE vehicle rotates the independently suspended drive wheels, transmitted by gears/pulleys and chain/belts to power a cylindrical bristle, spinning in the opposite direction of travel, to collect and funnel FOD via a ramp into a removable hopper. Bristle height is adjustable. At least one magnet and skid plate remove metallic FOD.

12 Claims, 24 Drawing Sheets

GROUND SUPPORT EQUIPMENT (GSE) BAGGAGE CART FOREIGN OBJECT DEBRIS (FOD) REMOVAL SWEEPING MECHANISM

CROSS-REFERENCES

This non-provisional patent application claims priority to provisional patent application 63/165,043 filed Mar. 23, 2021 (23 Mar. 2021)

BACKGROUND OF THE INVENTION

Field of the Invention

This invention relates to a mechanical or stationary mechanism to collect debris from hard surfaces. Particularly, this invention relates to retrofitting and attaching a mechanical or stationary mechanism to an existing vehicle to collect debris from hard surfaces.

Background Prior Art

At airports, research shows foreign object debris (FOD) can be highly detrimental to aircraft ground operations. FOD is any unwanted piece of material—steel, plastic, asphalt, passenger item—on an airside pavement surface (tarmac) at airports that could potentially damage an aircraft and/or ground vehicles. Runway FOD includes various objects, more specifically parts fallen from aircraft or vehicles, broken ground equipment, birds, among others that are present on a runway that may adversely affect fast-moving aircraft.

Sweeping is required to remove FOD. It may be done manually (which is prohibitable expensive) or with the airfield sweeper, which is the most effective equipment for removing FOD from airside surfaces. The sweeper removes debris from cracks and pavement joints, and should be used in all areas except for those that can be reached only with a hand broom.

Costs related to failures to remove FOD can be very expensive. Airlines spend millions of dollars every year in direct (damage to aircraft) and indirect (flight delays) damages. To combat FOD, there are many airfield sweeper on the current market that collect FOD effectively; however, they all have one drawback in common. To collect the debris, current products rely on an additional tow vehicle thus requiring additional energy and logistics, including additional airside ground vehicle movements and personnel to operate said vehicles.

There is a need for an improved FOD collection method that does not require additional energy, personnel, and logistics. The present invention could be implemented to address this problem and may be employed in non-airport settings.

Prior Art

A sweeper attachment for a refuse collection vehicle that utilizes either a conveyor system or a vacuum system to transport debris from a road surface to a collection body of the refuse collection vehicle has been disclosed. Consider U.S. Pat. No. 4,069,929 to Harker Jan. 24, 1978 (Mechanism for compacting material), or 20130322994 (Front-Loadable Refuse Container Having Side-Loading Robotic Arm With Motors And Other Mass Mounted At Rear Of Container And Use Of Same With Front-Loading Waste-Hauling Vehicle Having Hydraulic Front Forks Or Other Retractably Engageable Lift Means), among others. Additionally, a sweeper attachment which allows for the same vehicle to be used for two purposes including sweeping roadway surfaces has been disclosed by prior art. Consider U.S. Pat. No. 10,815,629 Goedken, et al. Oct. 27, 2020.

Novel Structural Element and Related Advantages of the Present Invention

While both ideas of attaching a sweeping mechanism to an existing vehicle are similar, the idea that makes the present invention unique compared to the garbage truck sweeper for example relates to both the structure that attaches to an existing vehicle and to other advantages. More specifically, the present invention discloses a support structure can be attached and removed from the underside of an existing vehicle in between the front and rear axles, such as an Airport ground support equipment (GSE). Airport GSE is used to service airplanes between flights. Services include refueling, towing airplanes or luggage/freight carts, loading luggage/freight, transporting passengers, loading potable water, removing sewage, loading food, de-icing airplanes, and fire-fighting. The present invention which may be retrofitted to GSE is capable of removing foreign object debris (FOD) from planar surfaces such as airside surfaces.

With solely this support structure a sweeping mechanism is not designed to be attached communicating with GSE Baggage Carts. An advantage of the present invention is that the capability transforming baggage carts into cleaning machines. The present invention incorporates a combination of track rollers and linear rails to allow the dynamical reconfiguration of the sweeping mechanism, thus surmounting the shortcomings of the prior art, namely static positioning of sweeping elements.

The prior art requires a permanent communication between a sweeping element and the GSE vehicle, thus limiting said GSE to a particular function, or the cleaning element to a particular GSE. The present invention overcomes this shortcoming by employing tabs. The advantage of tabs lies in that it enables the present invention to be moved for use from one GSE to another. The benefit of this feature is that the present invention may be moved from GSE to GSE as said GSEs require maintenance.

A novel structural equipment needed, namely the cart like structure that rides along the support structure. The cart like structure enables a sweeping mechanism to attach. A turntable that is a part of the cart like structure provides 360° movement for the sweeping mechanism, attached below. Direction of travel of the existing vehicle will not cause damage to either the vehicle or sweeping mechanism.

The cart like structure also contains track rollers that enable the entire assembly (the cart like structure and sweeping mechanism) to move linearly back and forth along the horizontal support structure. This allows for specific placement of the entire assembly anywhere along the support structure. In this case, allowing the entire assembly to be accessible outside the confines of a tight space under an existing vehicle (GSE Baggage Cart). Once assembled, the sweeping mechanism attached to the cart like structure can be moved from the edge of an existing vehicle to any location along the support structure. In this case, to the center of a GSE Baggage Cart. This also allows for removal and disposal of the collected debris without the need to go under an existing vehicle as all access to the sweeping mechanism is done from the side of the existing vehicle.

In short, this invention is unique when compared to the garbage truck sweeper due to the cart like structure that rides along the support structure 38 (the structure attached to an existing vehicle). The cart like structure allows the connected sweeping mechanism to rotate 360° as well as move linearly as one unit along the support structure 38s. This combination of movement allows all interactions between worker and sweeping mechanism to be performed at the edge of the existing vehicle rather than underneath it.

SUMMARY OF THE INVENTION

The mechanical or stationary mechanism to collect debris from hard surfaces is unique compared to existing systems because an extra vehicle is not needed; instead a support structure attached under pre-existing vehicles, such as a GSE Baggage Cart, between the front and rear axles. A cart like structure rides along the support structure and a mechanical or stationary mechanism can be attached and removed from this cart like structure.

The primary design goals considered when developing the support structure 38 and cart like structures include; 1. attachment and removal from a pre-existing vehicle, 2. linear movement of the attached mechanical or stationary mechanism, 3. 360° rotational movement of the attached mechanical or stationary mechanism. Ultimately, the installation of the support structure 38, and associated cart like structure, gives any pre-existing vehicle a dual purpose; specifically, GSE baggage carts will now have the ability to transport passenger's luggage as well as clean FOD from tarmacs. The support structure 38 and cart like structures has been designed and prototyped with input from industry experts and has been designed and tested on an existing GSE Baggage Carts. The support structure is attached to the underside of the H or I frame of a pre-existing GSE Baggage Cart, between the front and rear axles, and can be attached and removed with nuts and bolts. The cart like structure, upon which the mechanical or stationary mechanism is attached, rides along the support structure 38. The support structure 38 and cart like structures could also be used to retrofit any pre-existing vehicle, giving any vehicle a dual purpose, including fields other than aviation.

Advantages Over the Previous Provisional Patent Application

This provisional patent application has been improved in a number of ways compared to the prior art.

The present invention discloses a support structure 38 and cart like structures used to attach a mechanical or stationary mechanism to a GSE Baggage Cart. The two major aspects of the newly designed support structure 38 and cart like structures are the ability for the cart like structure to ride linearly along the support structure 38. This allows accessibility to the mechanical or stationary mechanism at the edge of a GSE Baggage Cart to remove collected debris from the collection hopper. The other major aspect is the ability for the mechanical or stationary mechanism to rotate 360° about the cart like structure. In short, the support structure 38 and cart like structures are the enabling medium allowing the mechanical or stationary mechanism to operate under a GSE Baggage Cart.

In addition, the mechanical or stationary mechanism attached to the cart like structure, riding along the support structure 38, has improvements. Most significantly, a suspension system has been added to the mechanical mechanism to ensure the drive wheels that power the mechanical mechanism are in constant contact with the ground. More so, additional gearing allows a bristle system to spin opposite of the drive wheels. The collection hopper's design has also improved for easy access when removing collected debris and the addition of a magnet for collection of metallic objects.

BRIEF DESCRIPTION OF THE DRAWINGS

The support structure is designed and fabricated with steel components including: linear rails and linear rail cross members with tabs to allow attachment to an existing vehicle. The cart like structure that rides along the support structure 38 is designed and fabricated with steel components including: linear rail track rollers, steel plates, solid surface rectangular turntable, and hitch receiver. All components for both structures are welded and/or connected with nuts and bolts.

DETAILED DESCRIPTION OF THE INVENTION

Figure 1:
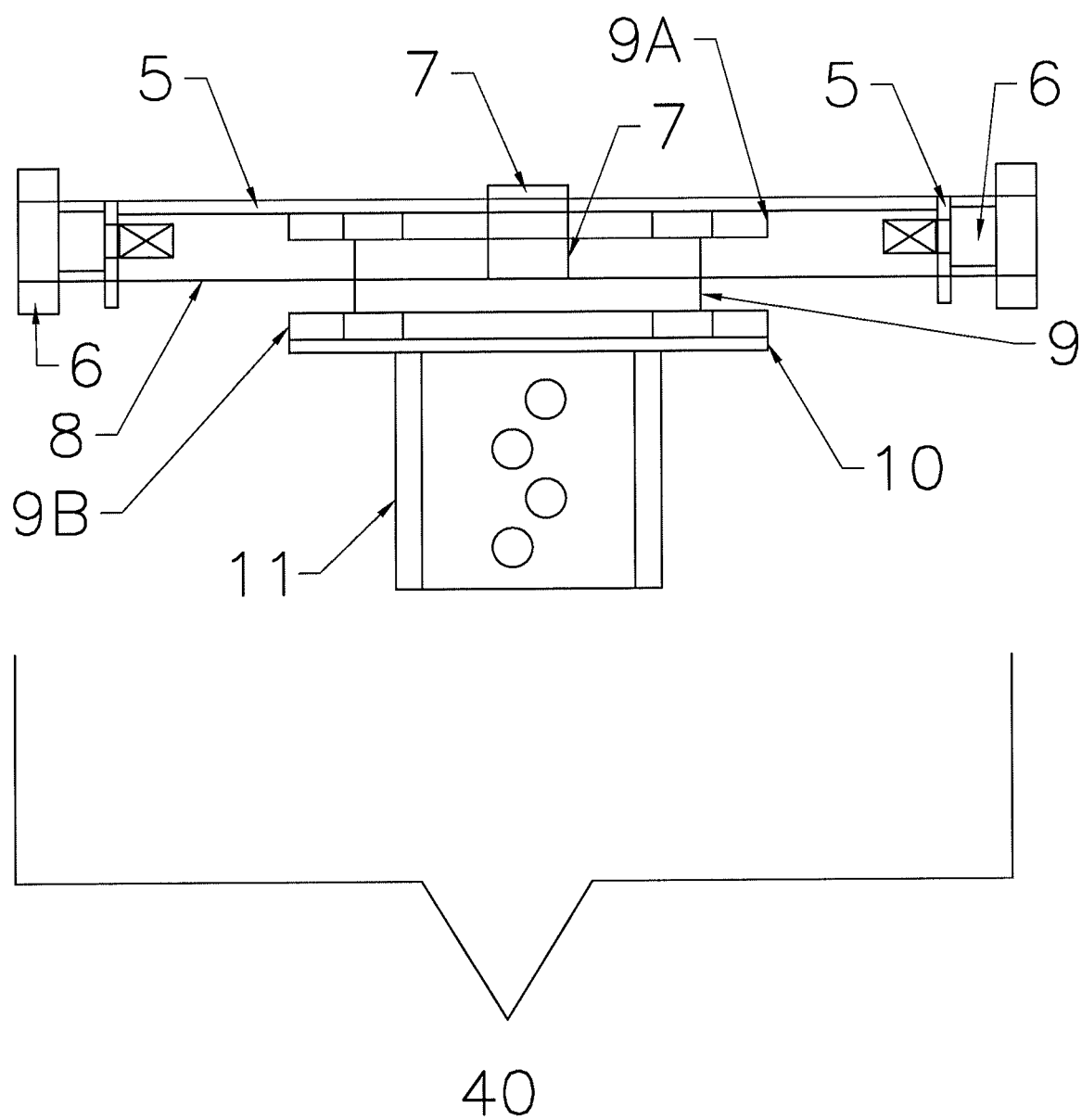
FIG. 1 is a side view of the total cart assembly.
Figure 1A:
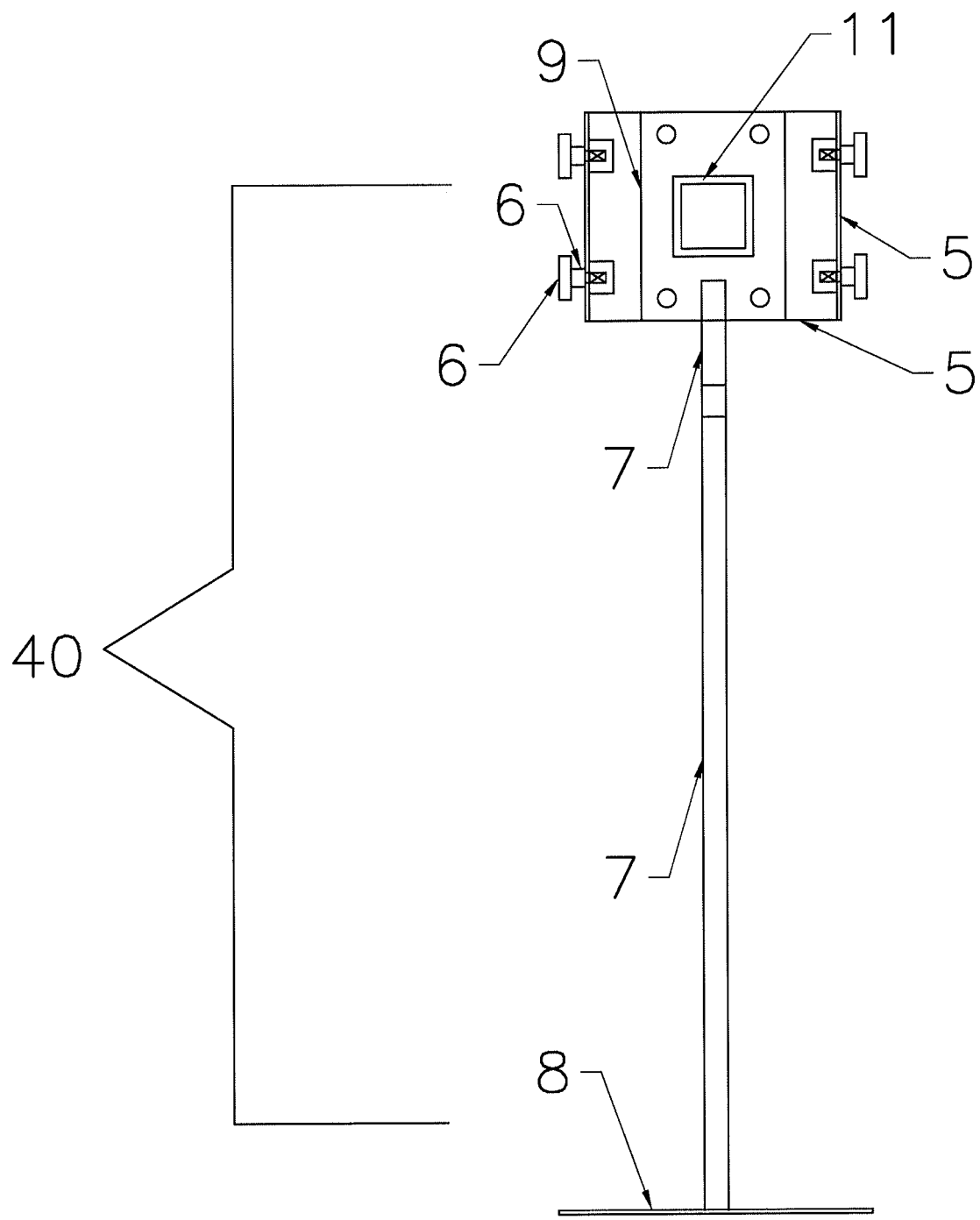
FIG. 1A is a top view of the total cart assembly.
Figure 1B:
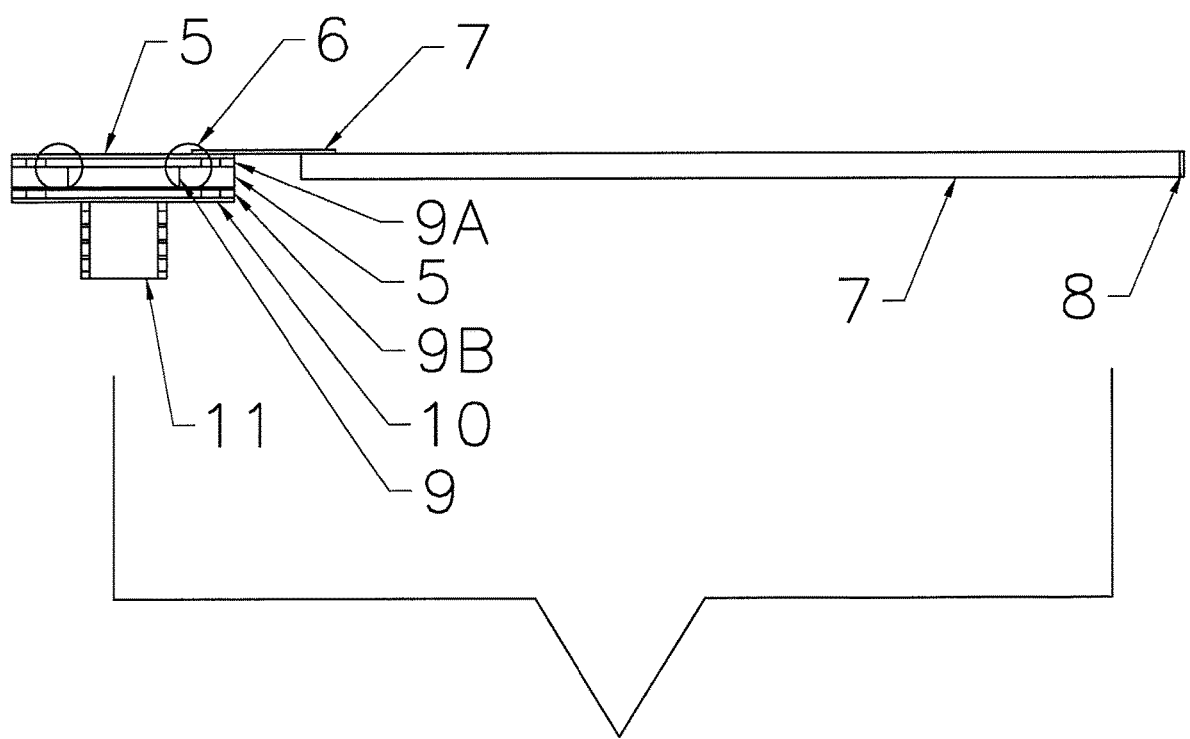
FIG. 1B is a front view of the total cart assembly.

FIGS. 1, 1A, and 1B depict the total cart assembly 40, comprised of cart 5, track rollers 6, rigid rod 7, rigid plate 8, turntable 9, rigid sheet 10, and hitch receiver 11.

Figure 2:
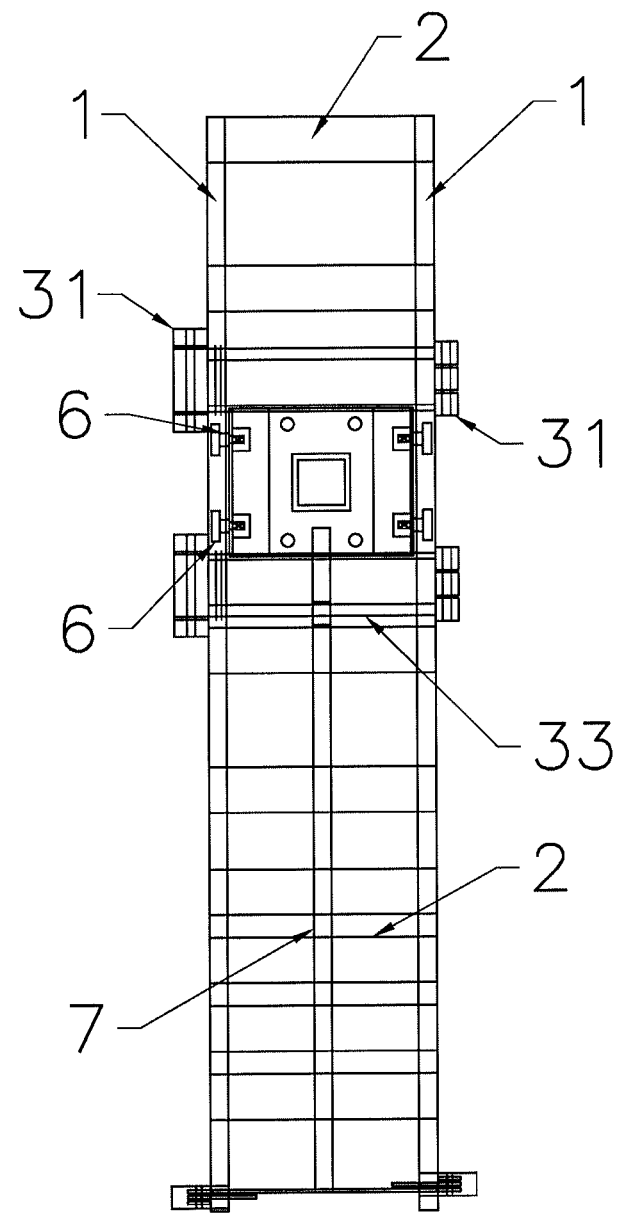
FIG. 2 is the top view of the support structure and total cart assembly.
Figure 2A:
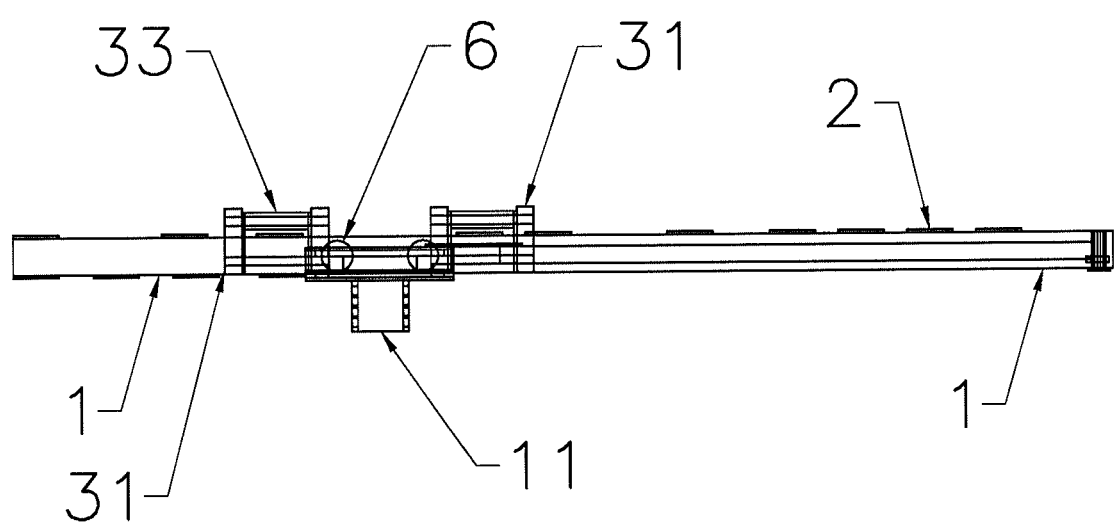
FIG. 2A is the front view of the support structure and total cart assembly.
Figure 3:
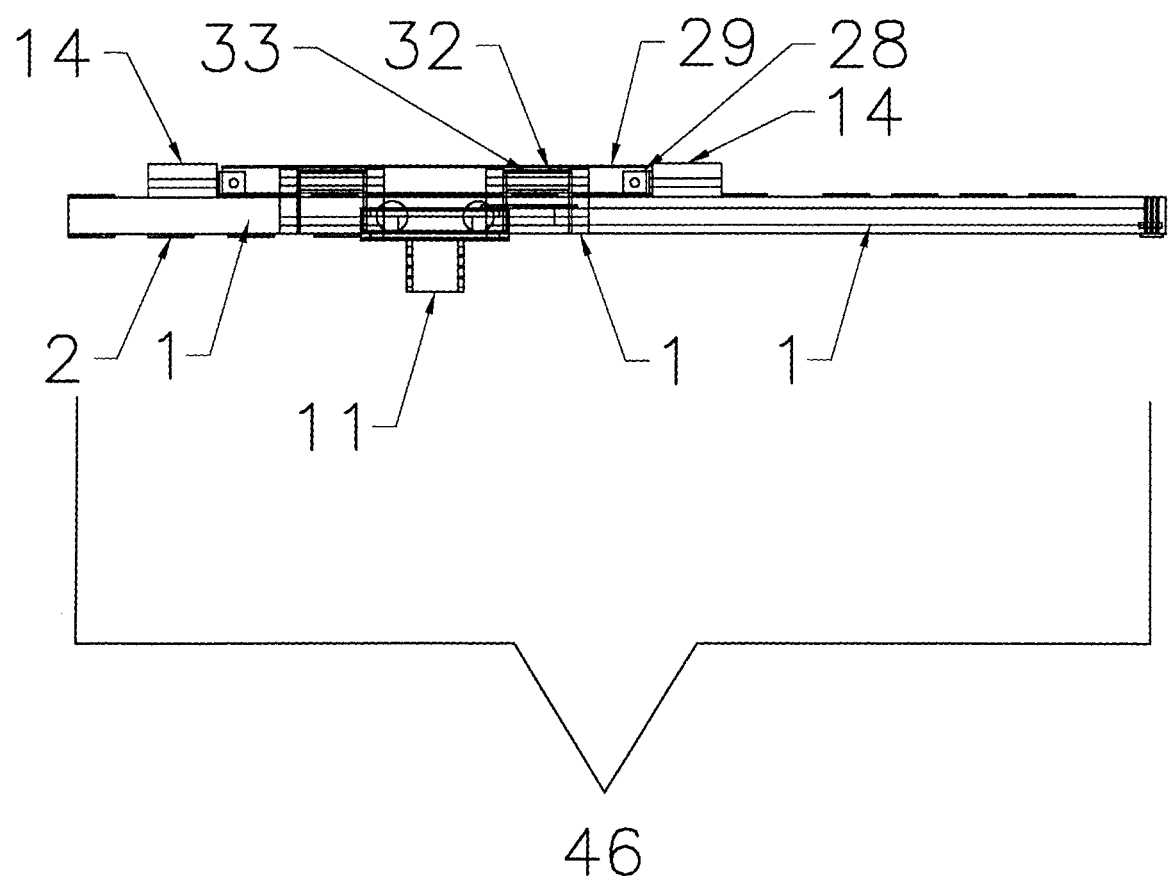
FIG. 3 is a front view of the support structure, total cart assembly, and the communication element allowing the linear rail and associated cart-like structure to attach to existing GSE.

FIGS. 1, 2, and 3, wherein FIGS. 2 and 3 show linear rails 1, two (2) rigid linear rails 1 are aligned parallel to one another and perpendicular to rectangular rigid plate cross members 2 that are in communication above and below rails 1 creating a solid structure. In an alternative embodiment, steel L-brackets (not shown) may be used to replace the communication element 37.

Figure 3A:
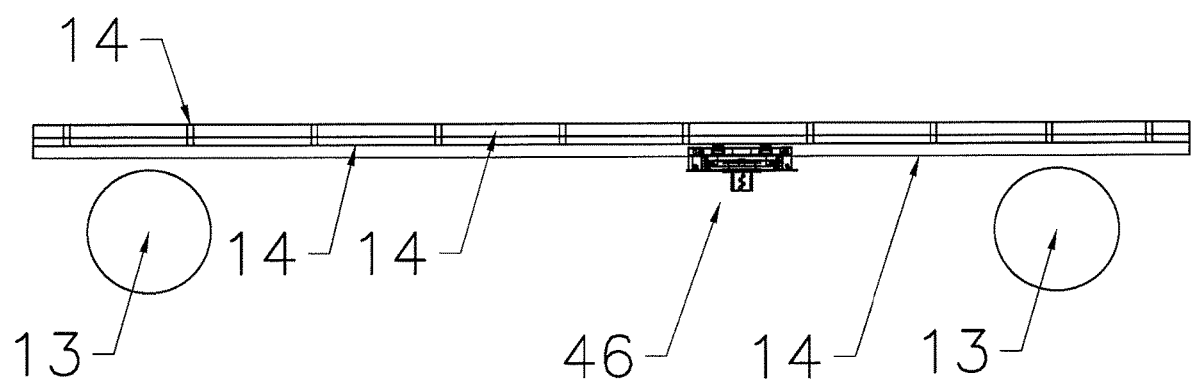
FIG. 3A is a side view of the components disclosed in FIG. 2B when attached to an existing GSE.
Figure 3B:
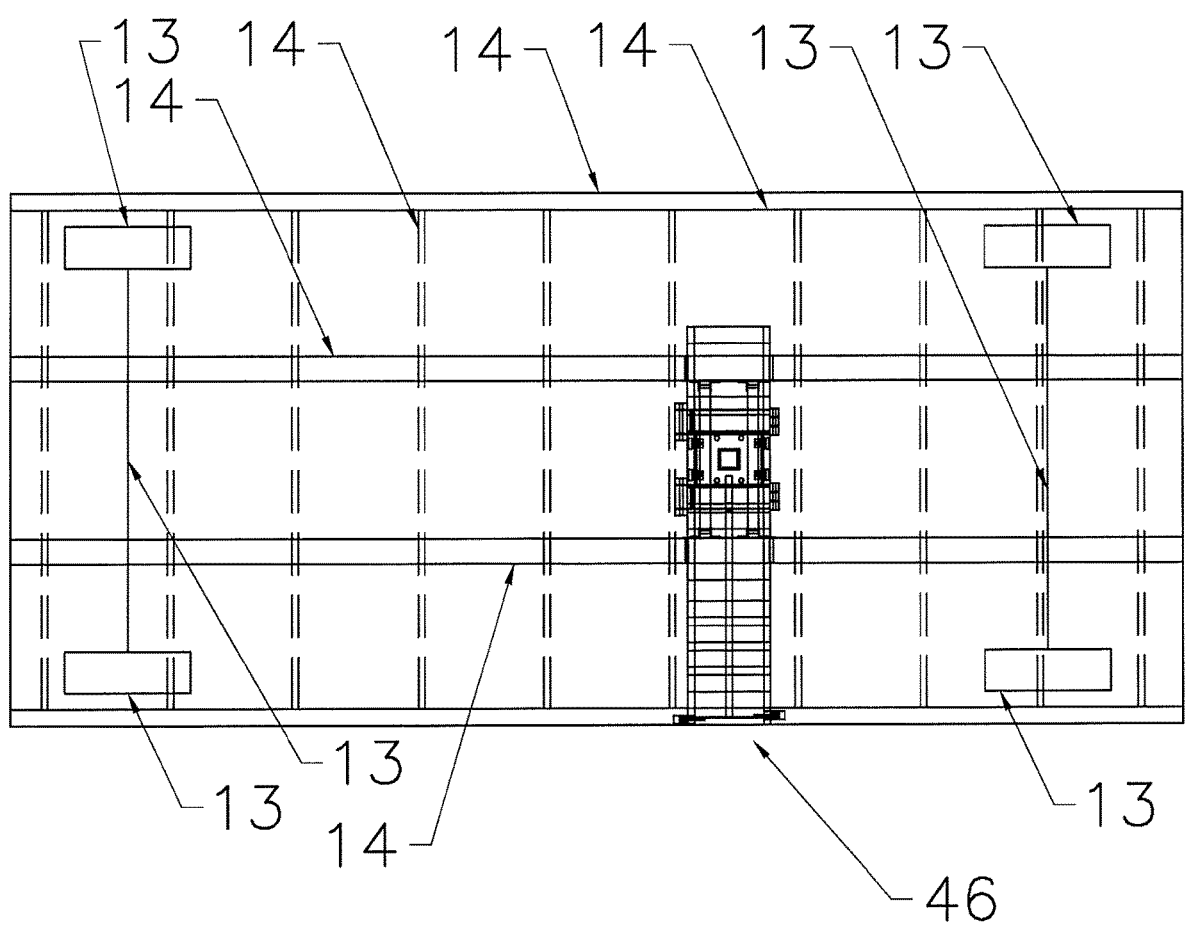
FIG. 3B is the top view of the components disclosed in FIG. 3A.
Figure 3C:
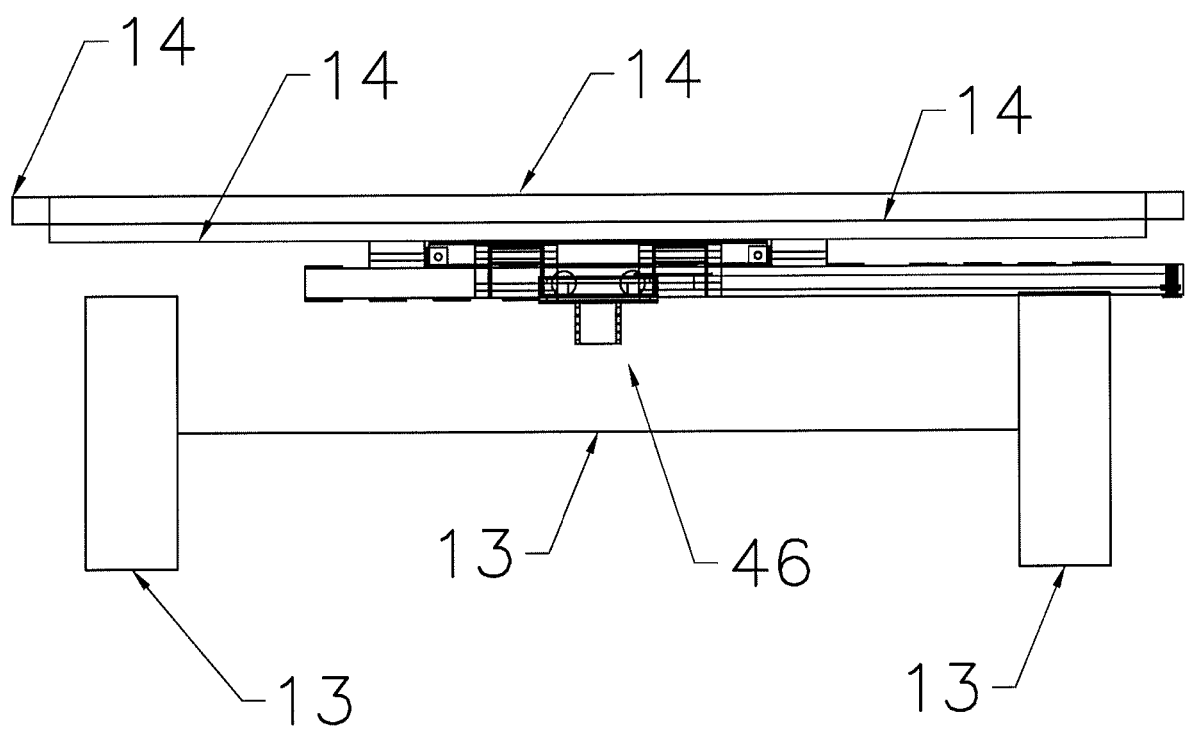
FIG. 3C is the front view of the components disclosed in FIG. 3A

FIG. 2 and FIG. 3 show a system of male tab 33 and female tabs 32 that may be used to provide structural support by a female tab 32 being affixed to the GSE which, in turn, may be affixed to linear rail 1. FIG. 3A, FIG. 3B, and FIG. 3C show the support structure, total cart assembly, and communication element affixed to a GSE vehicle.

The present invention's removability capability feature results from 37 the use of tabs (insertable rigid connectors). More particularly, male tabs 33 affix to the rigid tab support attachment 31 which in turn is attached to support structure 38. Whereas female tabs 32 are attached to communication element 37 which in turn is connected to the existing GSE structure 14. The use of tabs allows the present invention to remain in a relatively fixed position while in use while simultaneously allowing the present invention to be removed easily.

Figure 1C:
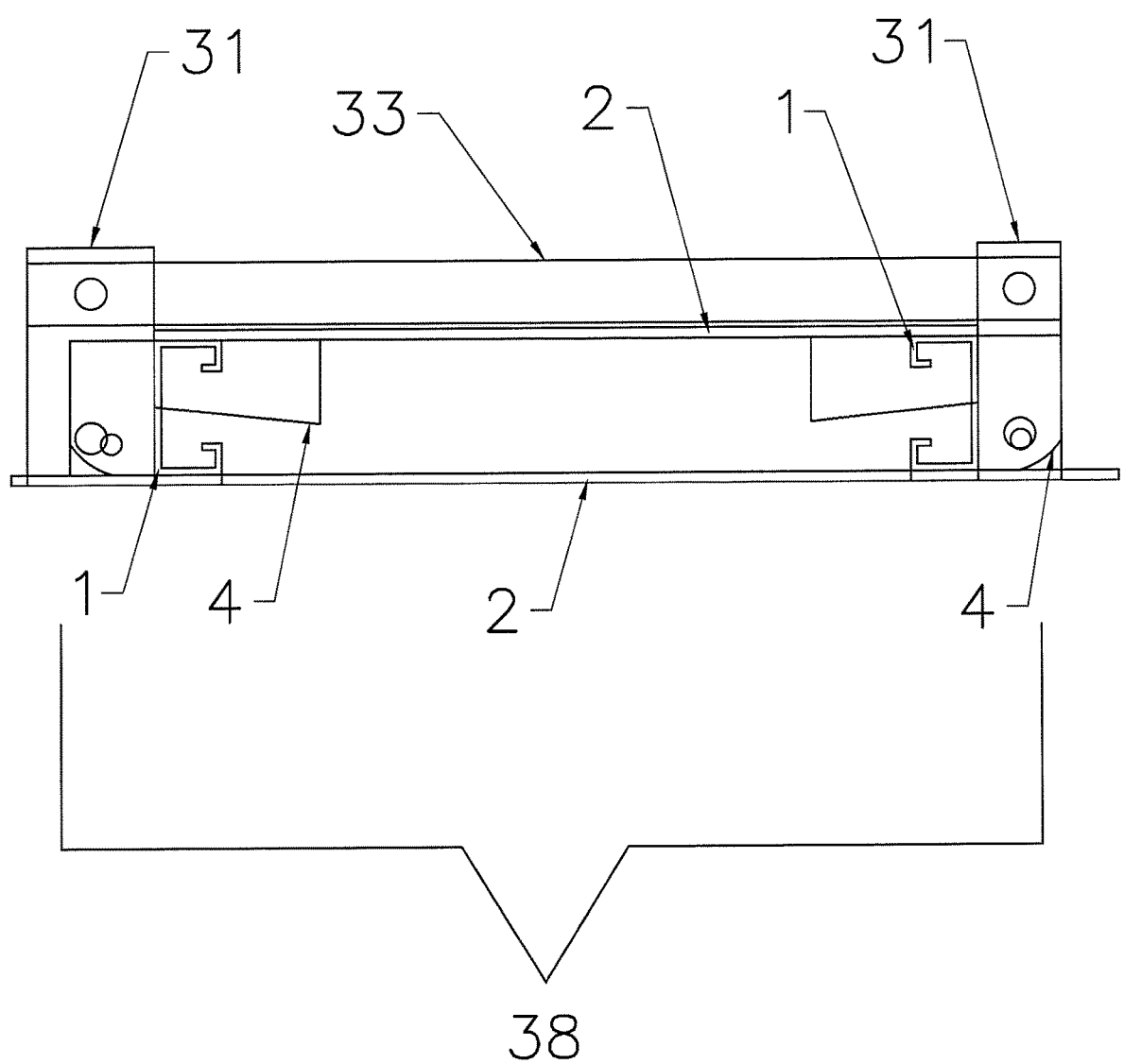
FIG. 1C is a side view of the support structure.
Figure 1D:
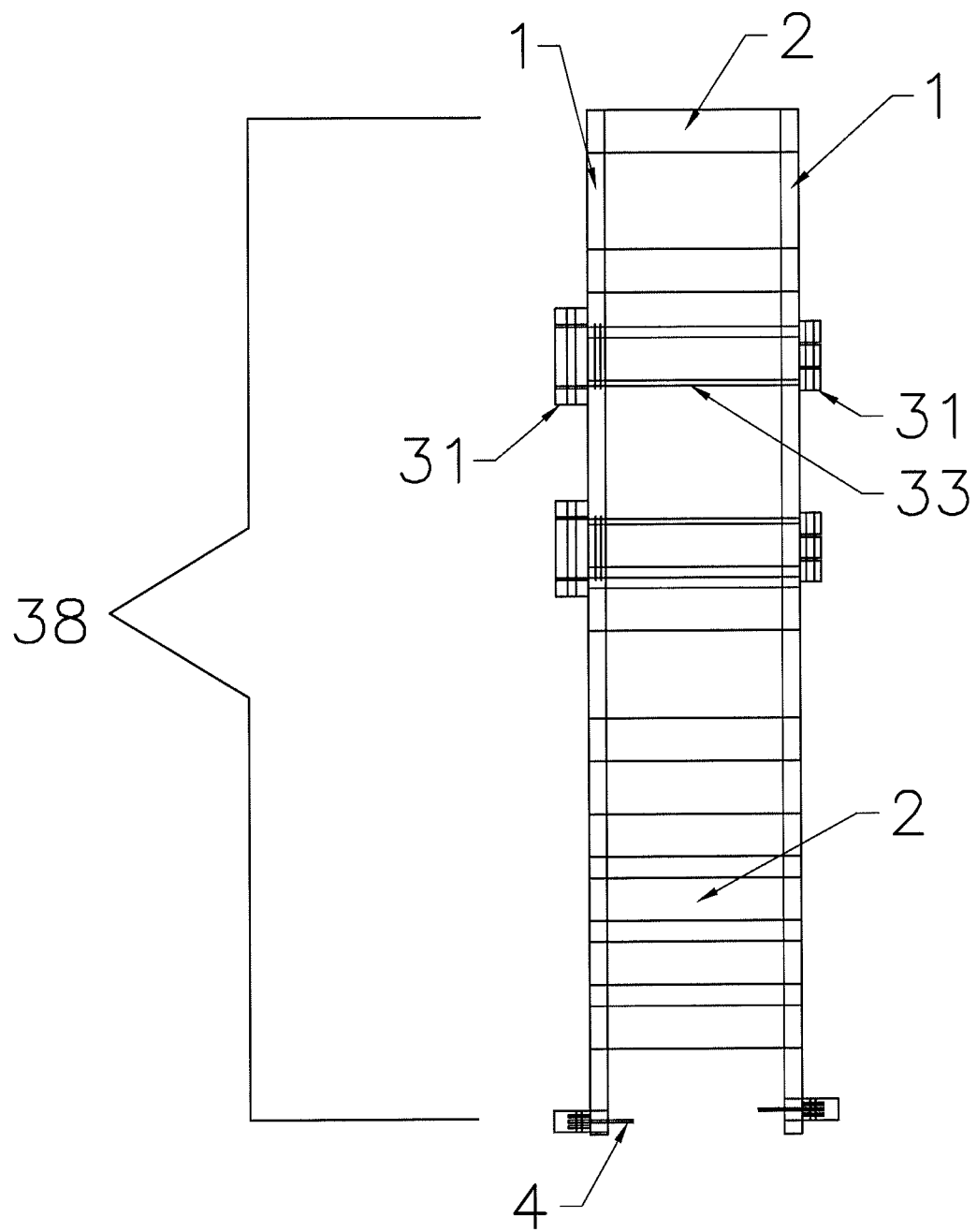
FIG. 1D is a top view of the support structure.
Figure 1E:
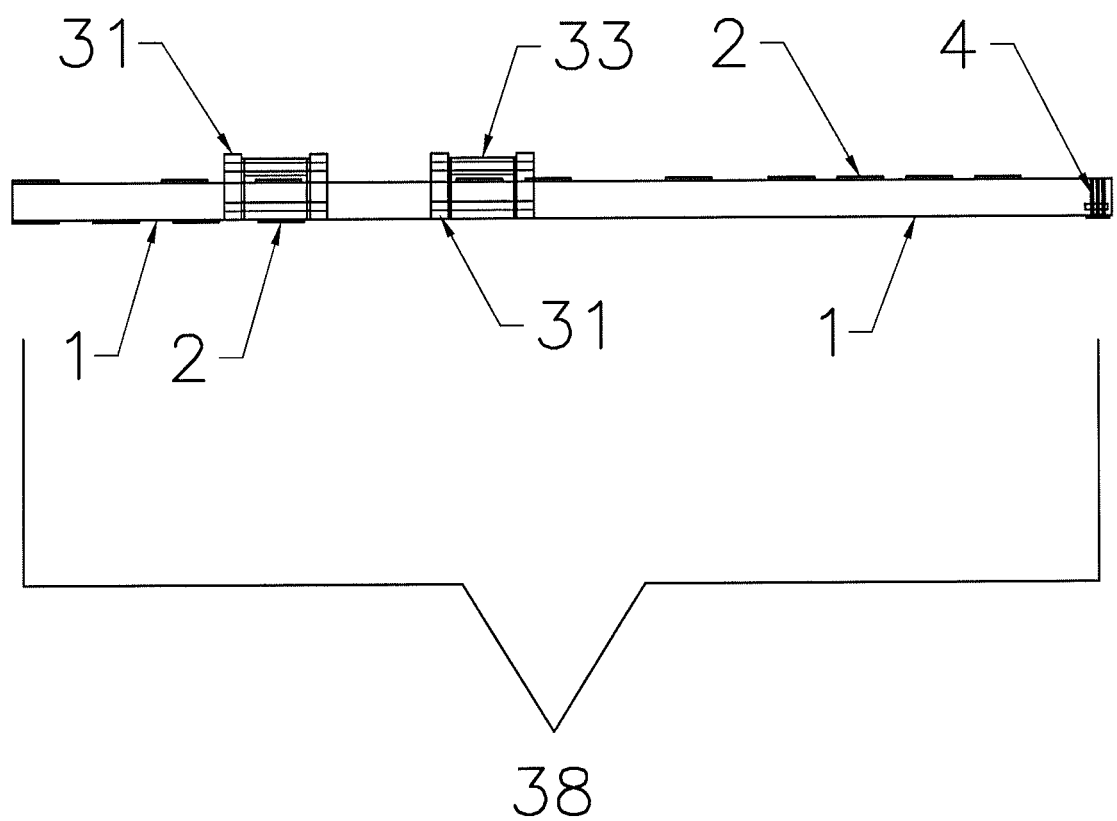
FIG. 1E is a front view of the support structure.
Figure 1F:
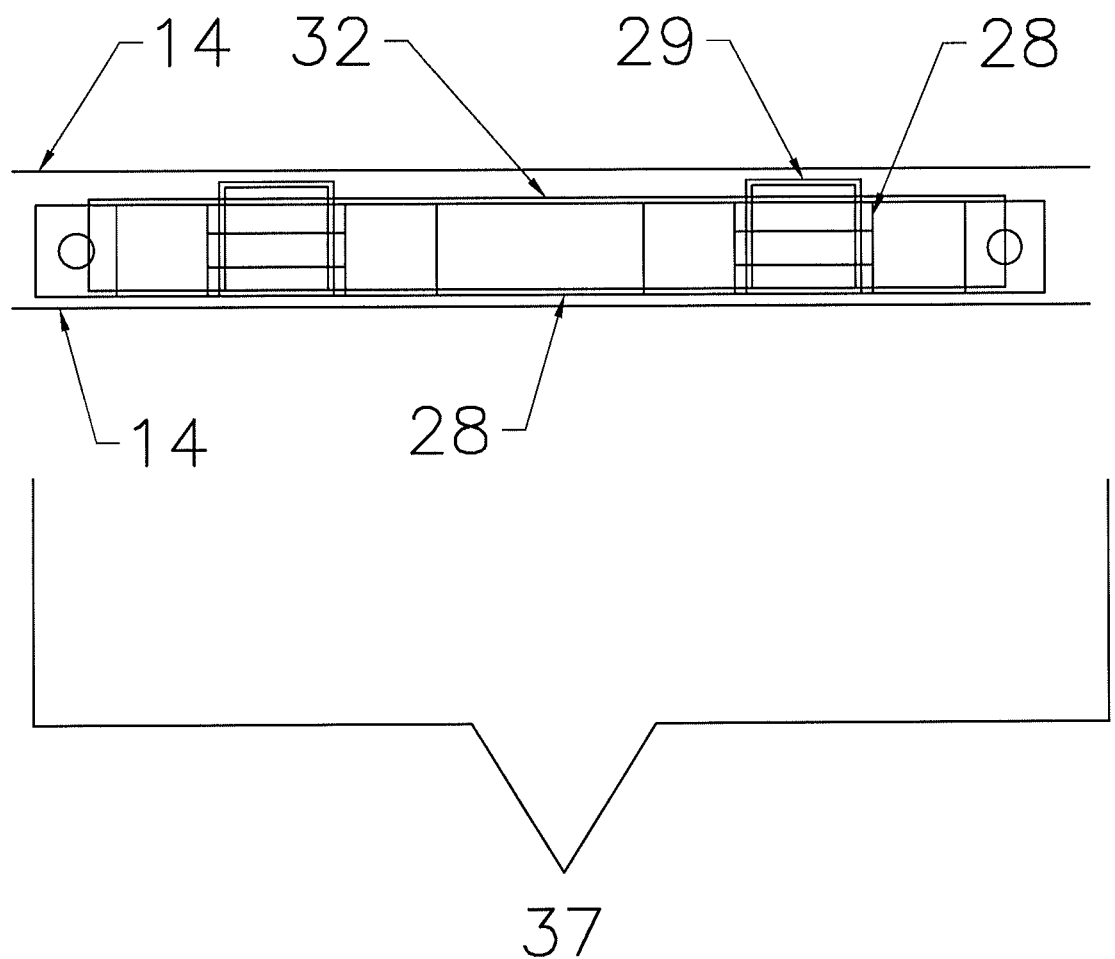
FIG. 1F is a side view of the communication element.
Figure 1G:
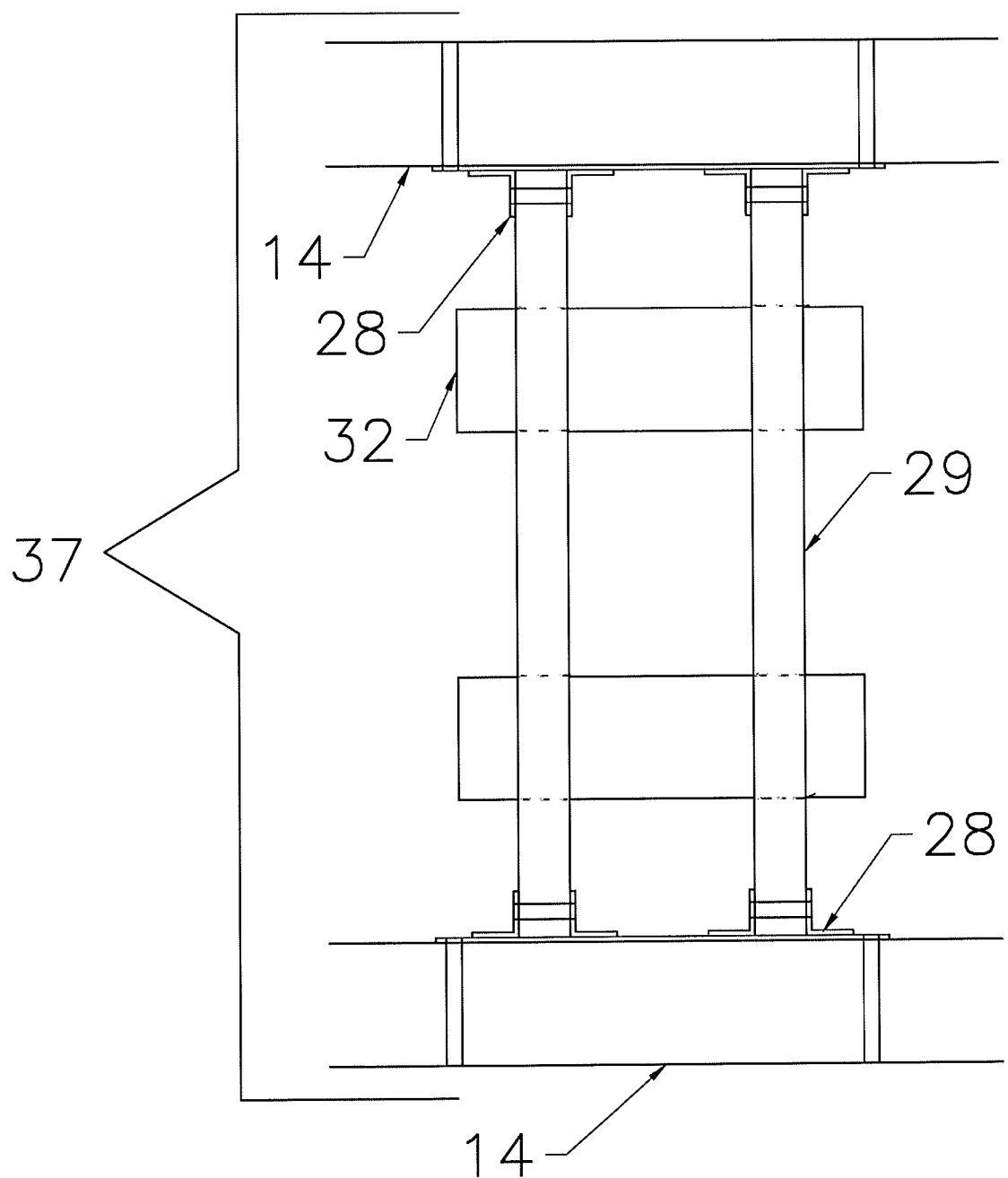
FIG. 1G is a top view of the communication element.
Figure 1H:
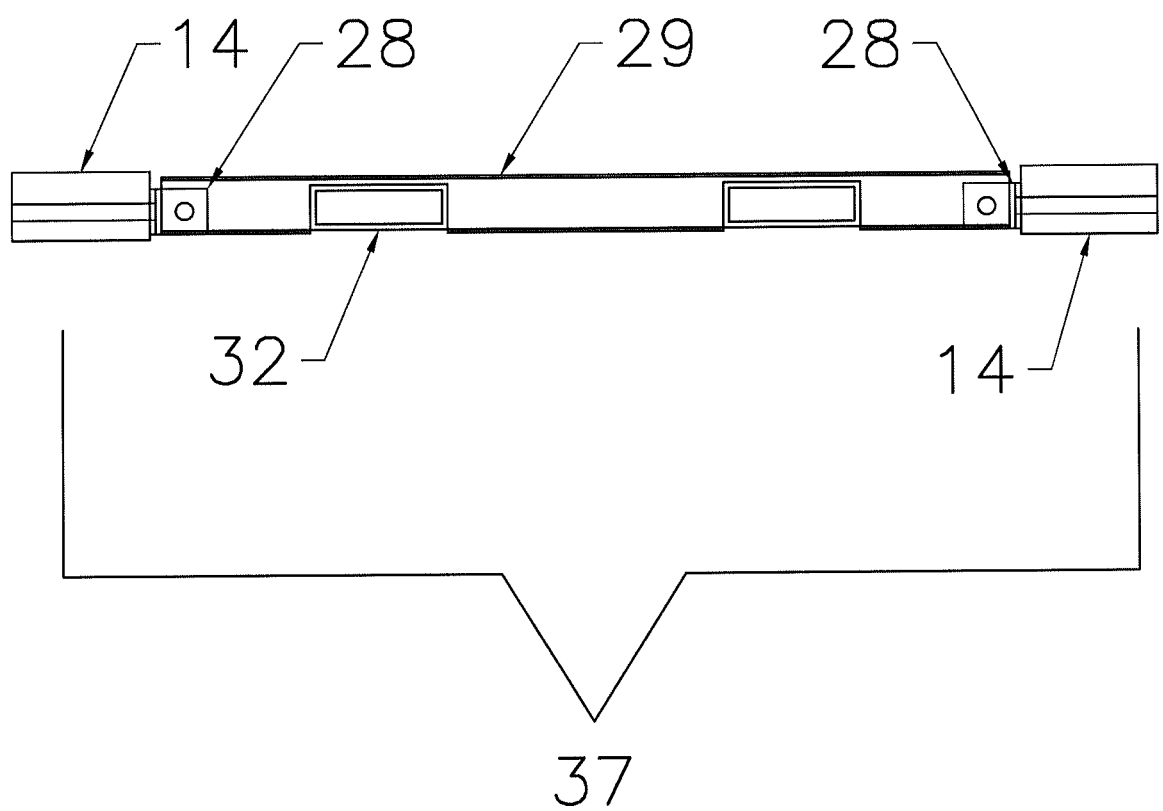
FIG. 1H is a front view of the communication element.
Figure 1I:
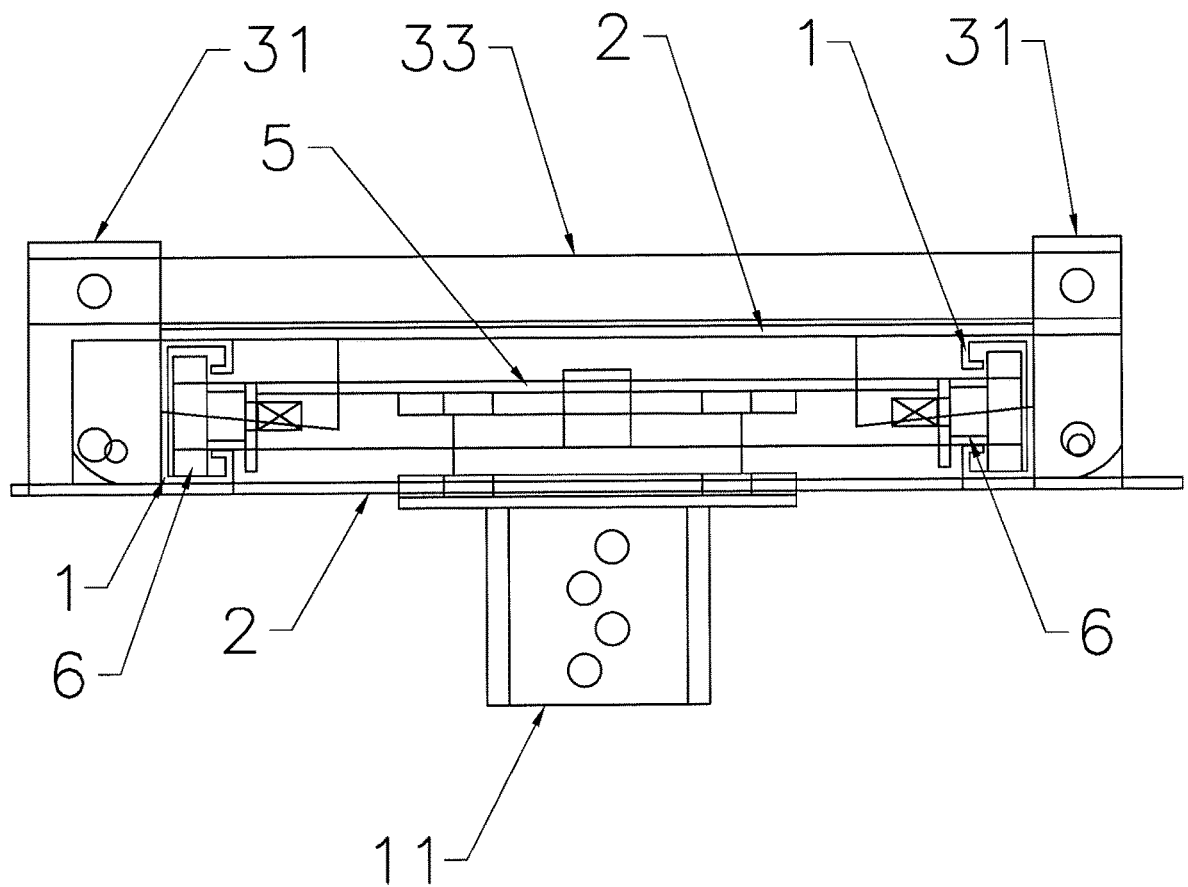
FIG. 1I shows a side view of the combined total cart assembly in relation to the support structure.

FIGS. 1C, 1D, and 1E show the support structure 38, and fixed supports for male tabs 33. Female tabs 32 and connection to GSE vehicle in relation are depicted in FIGS. 1F, 1G, and 1H. Additionally, FIG. 1F discloses the relative position of existing vehicle attachment (GSE baggage cart) 28, existing vehicle attachment (GSE baggage cart) cross-member 29, and female tabs 32 as disposed on existing GSE structure 14. Note that FIG. 1F calls out how the existing vehicle attachment (GSE baggage cart) 28 and existing vehicle attachment (GSE baggage cart) cross-member 29 support female tabs 32. FIG. 1G and FIG. 1H illustrate this relationship from other perspectives. In sum, the use of male tabs 33 and female tabs 32 result in the removability of sweeping mechanism 39.

Existing GSE structure 14 may be composed of parallel and perpendicular elements. The present invention may be attached in any orientation. Consequently, the present invention may be oriented either parallel or perpendicularly to the GSE's direction of movement. In the preferred embodiment, all elements of the present invention are located within the area defined by the footprint of the GSE vehicle. However, in an embodiment where GSE has only operational side, such as a single-door baggage hauler, the present invention may optionally beyond said confines.

Communication element 37 is in communication with support structure 38 via at least one female tab 32 and at least one male tab 33. Said male tab 33 is supported by a rigid tab support attachment 31 for affixing to support structure 38 linear rail tops of specific cross members, allowing attachment to an existing vehicle's structure. In addition, the open side of the support structure 38 contains two slightly staggered slits, one on each of the linear rails. The staggered slits are cut into the linear guide rails and rigid plate blockers are placed at both slit locations, limiting the movement of the cart like structure that rides along the rail system.

The present invention discloses a support structure 38 depicted in FIGS. 1C, 1D. Said support structure 38 enables connection of female tabs 32 to the GSE vehicle as well as allowing cart-like structure 5 to move linearly along linear rails 1. Cart-like structure 5 in turn connects to a sweeping mechanism 39 disposed below cart-like structure 5. Said sweeping mechanism may be dynamic or stationary.

The present invention discloses track rollers 6 as shown in FIGS. 1, 1A, 1B, 1I, 2, 2A, 2B, 2C, 3, among other references. Said track rollers 6 communicate with cart-like structure 5 and linear rail 1. Said rollers 6 allow the cart-like structure 5 to move linearly along linear rails 1 for the purpose of permitting movement of the cart-like structure 5 to allow access to a collection hopper 24.

Figure 2B:
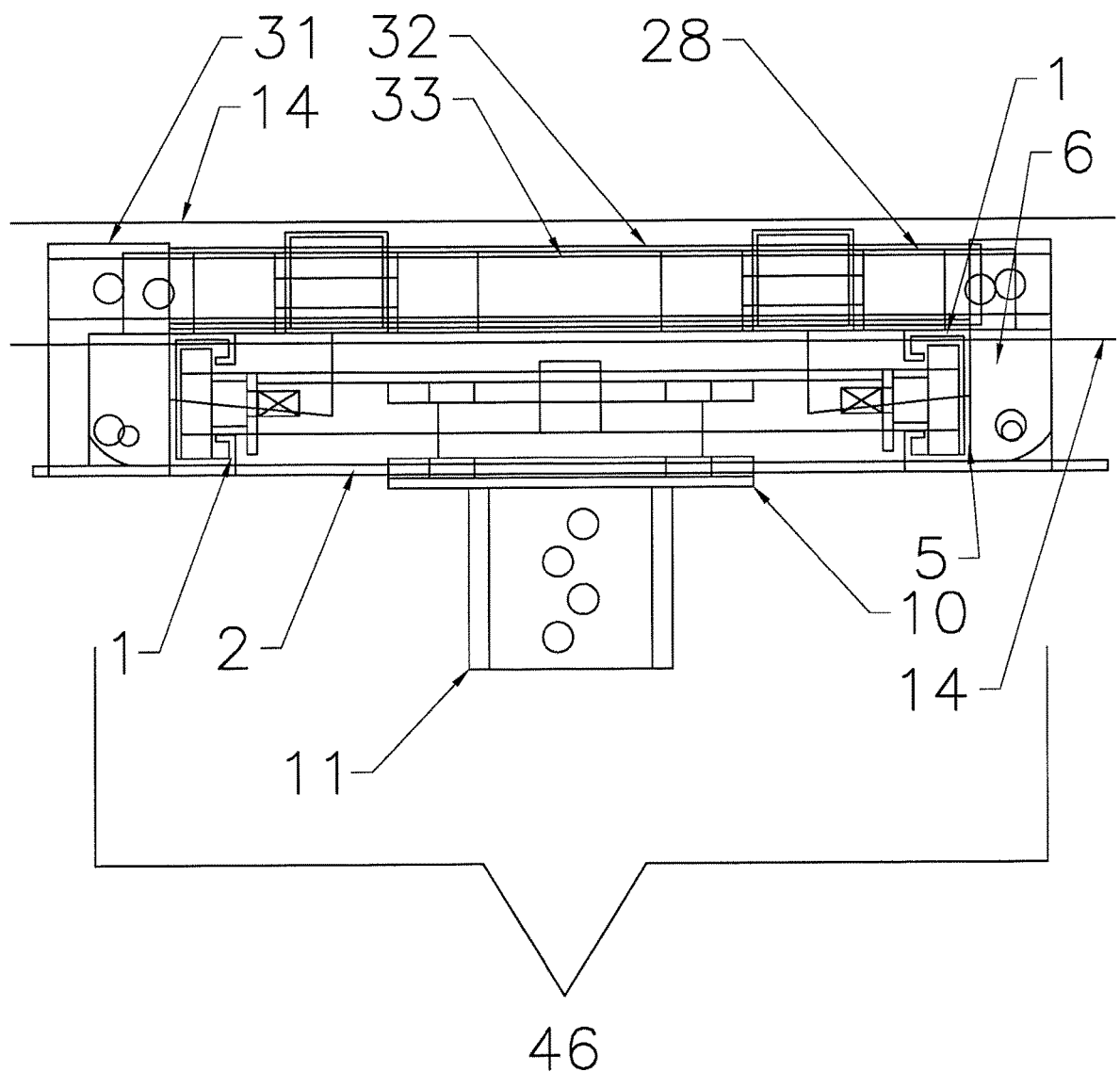
FIG. 2B is a side of the support structure, total cart assembly, and communication element (showing a combination of FIGS. 1, 1C, and 1F).
Figure 2C:
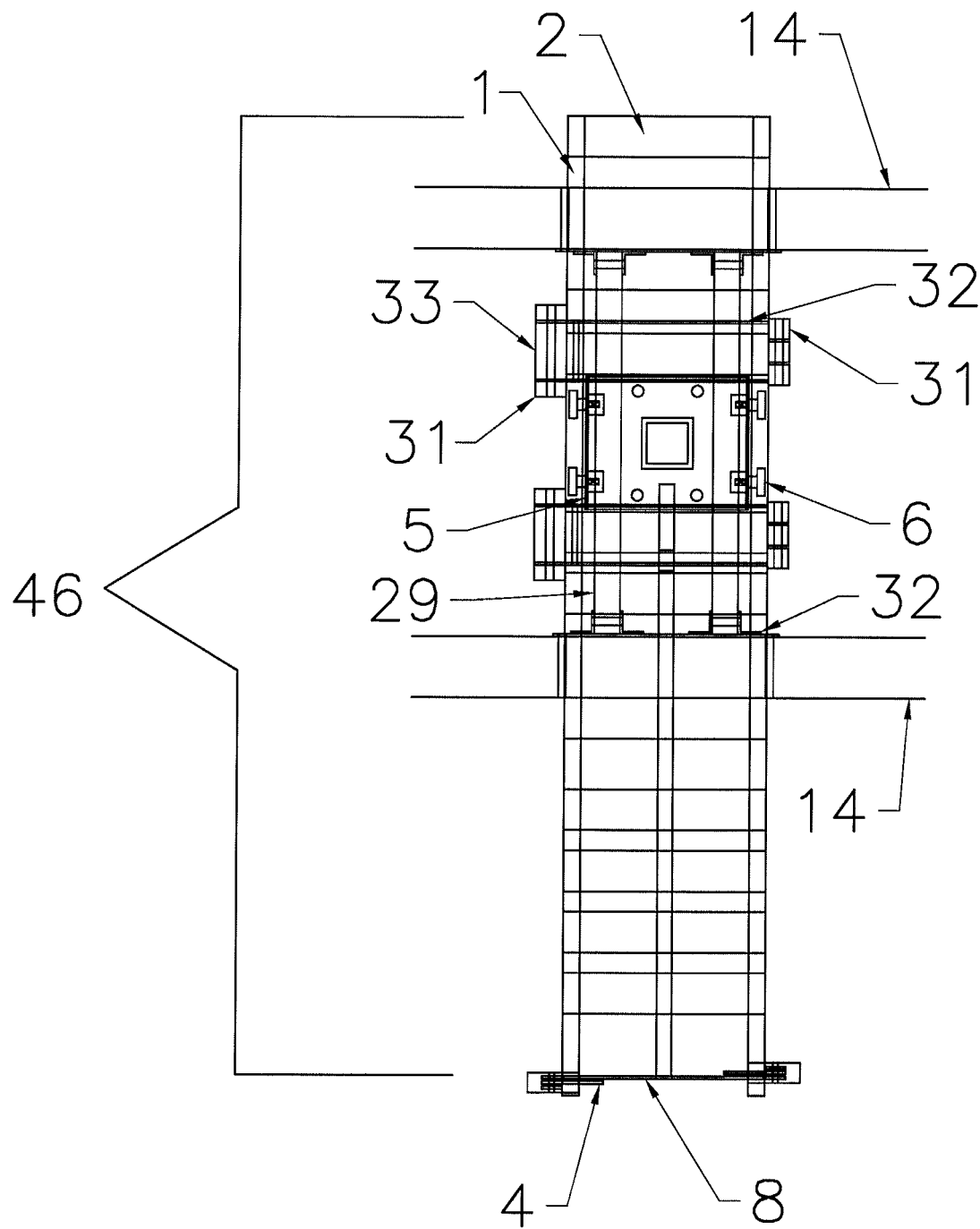
FIG. 2C is a top view of the components disclosed in FIG. 2B.

As depicted in FIGS. 2B and 2C, the present invention allows track roller 6/linear rail 1 the capability of dynamically reconfiguring the position of sweeping mechanism 39.

FIG. 1E discloses a front view of the support structure and relative positioning of linear rail cross-members 2, linear rail to existing GSE tab support 31, and linear rail to existing vehicle male tab attachment 33, and total cart plate blockers 4. A plurality of linear rail cross members 2 on the top of the linear rail 1, and at least one linear rail cross-member 2 on the bottom of linear rail 1. Said linear rails are necessary to fix in place said linear rail 1.

The present invention discloses rigid rod 7 in communication with cart-like structure 5 and rigid plate 8. Rigid rod 7 is capable of moving cart-like structure 5 forward and back along linear rail 1.

The present invention discloses rigid plate 8 in communication with rigid rod 7 and cart-like structure plate-blockers 4, Said rigid plate 8 is capable of restricting linear movement of cart-like structure 5 while in operation.

Also disclosed is at least one turntable 9. Said at least one turntable 9 is composed of a top element 9A and a bottom element 9B, which communicate by ball bearings (not shown) disposed therebetween. Said top element 9A communicates cart-like structure 5. Said bottom element 9B communicates with rigid sheet 10. Rigid sheet 10 is permanently affixed to hitch receiver 11. Turntable 9 is capable of 360° rotation permitting the sweeping mechanism to move freely without respect to the direction of movement of the external GSE.

Figure 4:
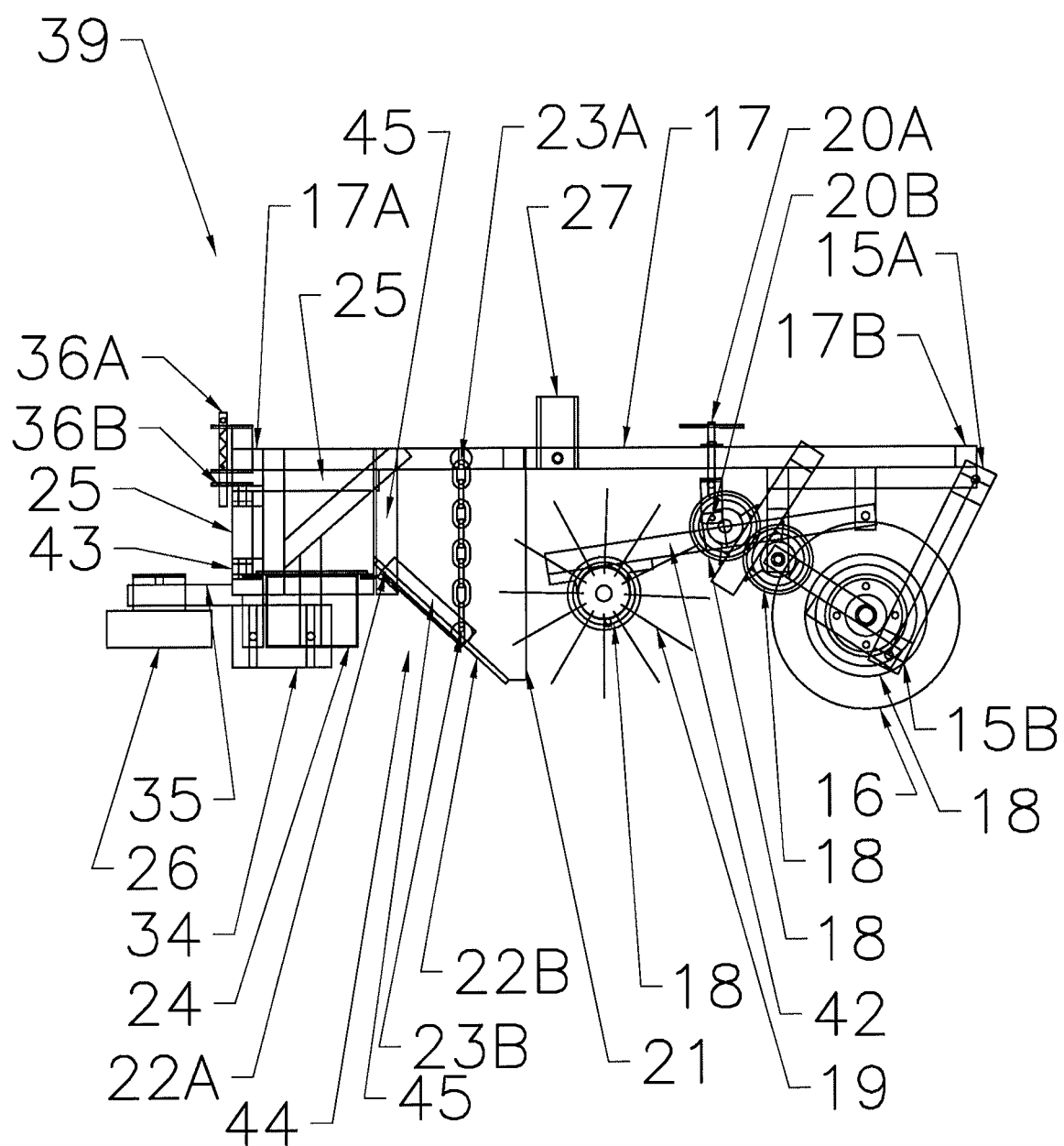
FIG. 4 is the side view of the sweeping mechanism.
Figure 5:
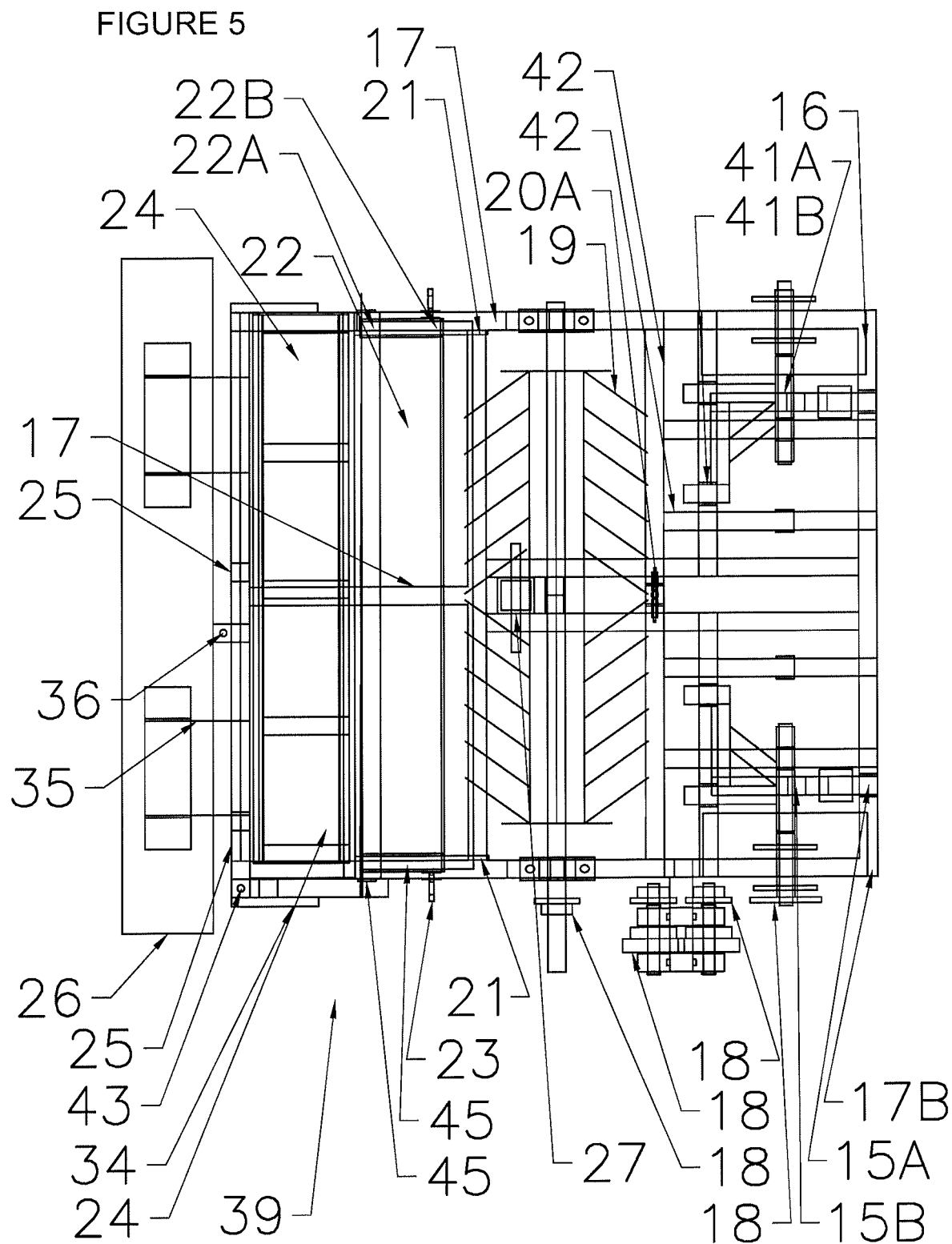
FIG. 5 is the top view of the sweeping mechanism.

FIG. 4 and FIG. 5 depict side view and top view of the sweeping mechanism 39 disclosed by the present invention. Sweeping mechanism 39 communicates with hitch receiver 11. Sweeping mechanism 39 is comprised of hitch shank 27 which communicates to mechanical sweeper frame 17. Mechanical sweeper frame 17 has a first end 17A and a second end 17B. Mechanical sweeper frame first end 17A communicates with shock absorber 15. Shock absorber 15 has a first end 15A and a second end 15B. More specifically, mechanical sweeper frame second end 17B communicates with shock absorber first end 15A. Said shock absorber second end 15B communicates with trailing arm 41 (shown in FIG. 5). Said trailing arm has a first end 41A affixed to drive wheel 16 and a second end 41B communicates with mechanical sweeper frame 17 (FIG. 5).

Mechanical sweeper frame first end 17A communicates with rotatable hooper arm 25. Rotatable hooper arm 25 via at least one pivot joint 43 making rotatable hopper arm 25 capable of movement. Said rotatable hopper arm 25 communicates with skid plate 34 and magnet support 35. Magnet support 35 supports magnet 26 as shown in FIG. 4. Skid plate 34 protects magnet 26 and collection hopper 24 from damage. Magnet 26 gives the invention the capability of retrieving ferrous material from the planar surface.

Additionally, sweeping mechanism 39 also has a spring loaded pin hitch 36 which communicates with mechanical sweeper frame first end 17A as well as rotatable hopper arm 25. Generic gear/chain/belt assembly 18 communicates with drive wheel 16 as shown in FIGS. 4 and 5. Said gear/chain/belt assembly 18 communicates with cylindrical bristle sweeper 19 via a common belt or chain (not shown). Said spring hitch 36, while mounted on mechanical sweeper frame 17, extends through said mechanical sweeper frame 17 to communicate with rotatable hopper arm 25 as further shown in FIGS. 4 and 5. Said extension governs movement of rotatable hopper arm 25 allowing either static or dynamic positioning.

Said cylindrical bristle sweeper 19, gear/chain/belt assembly 18, and drive wheel 16 communicate with each other via a series of sprockets, gears and mesh. Said cylindrical bristle sweeper 19 is supported by bristle support arm 42. Said bristle support arm 42 communicates with a bristle height adjustment/jack screw 20 which, in turn, communicates with mechanical sweeper frame 17.

Still further, sweeping mechanism 39 also has a collection hopper 24 which communicates with rotatable hopper arm 25. Said collection hopper 24 is slidably removable via rails (not shown) mounted on rotatable hopper arm 25.

Sweeping mechanism 39 further comprises a ramp subassembly 44. Ramp subassembly 44 comprises ramp 22, a chain 23, and ramp guides 45. Ramp 22 has a first end 22A communicating with mechanical sweeper frame 17, and a second end 22B communicating with ramp 22. Chain 23 has a first end 23A communicating with mechanical sweeper frame 17, and a second end 23B communicating with ramp second end 22B. Ramp first end 22A communicates with ramp guides 45 making device capable of raising or lowering ramp 22. Ramp guides 45 is a vertical support element fixing the position of the top of ramp 22A.

Sweeping mechanism 39 further comprises curtain 21 which communicates with mechanical sweeper frame 17.

Referring primarily to FIGS. 1, 2, and 3 a cart like structure contains four holes, two (2) holes on each side of vertical portions of the cart-like structure. Four (4) track rollers are bolted to the four (4) holes to allow the entire cart to ride along the support structure 38. A rigid rod is connected to the cart like structure to push and pull the cart along the linear guide rails, reachable from the edge of the support structure 38. The opposite side of the same steel rod contains a steel plate. The rigid plate fits between the two staggered slits on the linear rails, limiting the U-shaped cart structures movement. The top side of a solid surface rectangular turntable is bolted to the underside of the U-shaped cart structure. A rigid plate is bolted to the underside of the same solid surface rectangular turntable. A hitch receiver with multiple pin holes is welded to the plate to create a vertically oriented hitch receiver. Then a hitch shank can be locked into a variety of different locations. The hitch shank is connected to a mechanical or stationary mechanism that cleans debris off hard surfaces.

Figure 6:
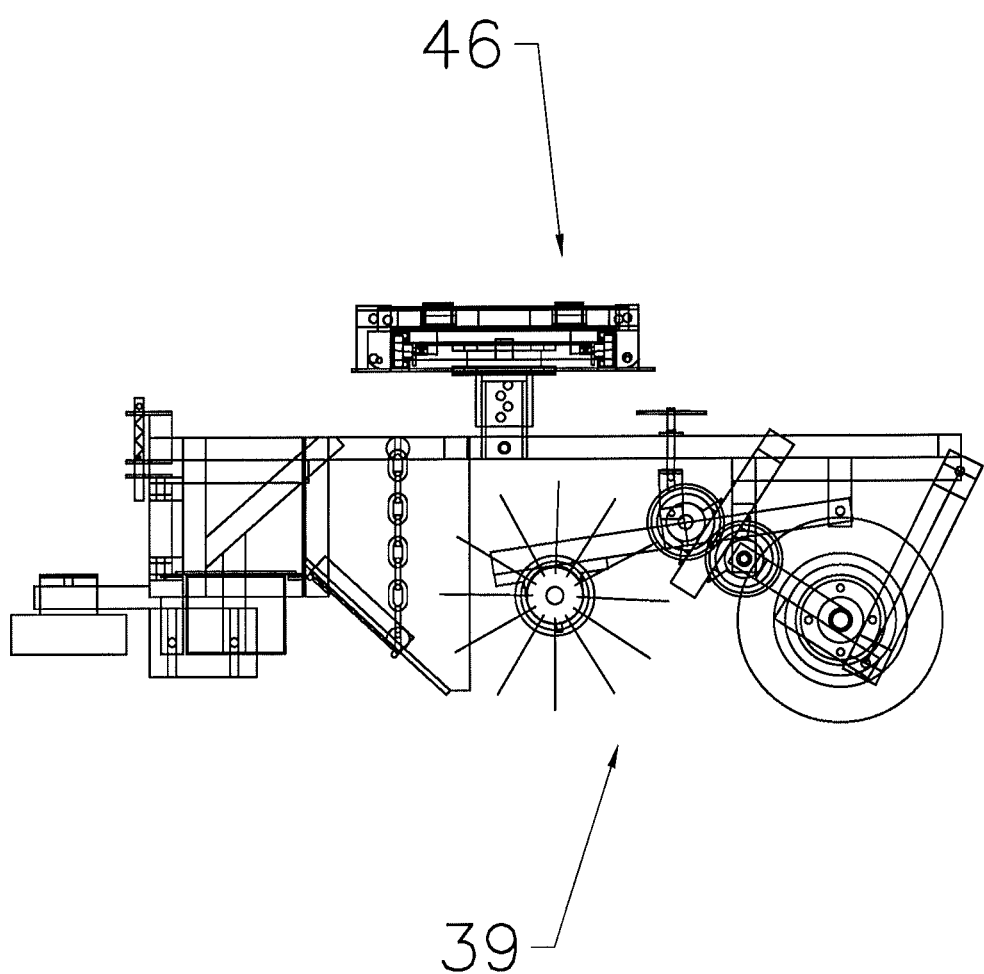
FIG. 6 is the side view of the sweeping mechanism and the assembly of the communication element, support structure, and total cart assembly.

FIGS. 4, 5, and 6 are FIGS. 1, 2, and 3 when attached to an existing vehicle.

Figure 7:
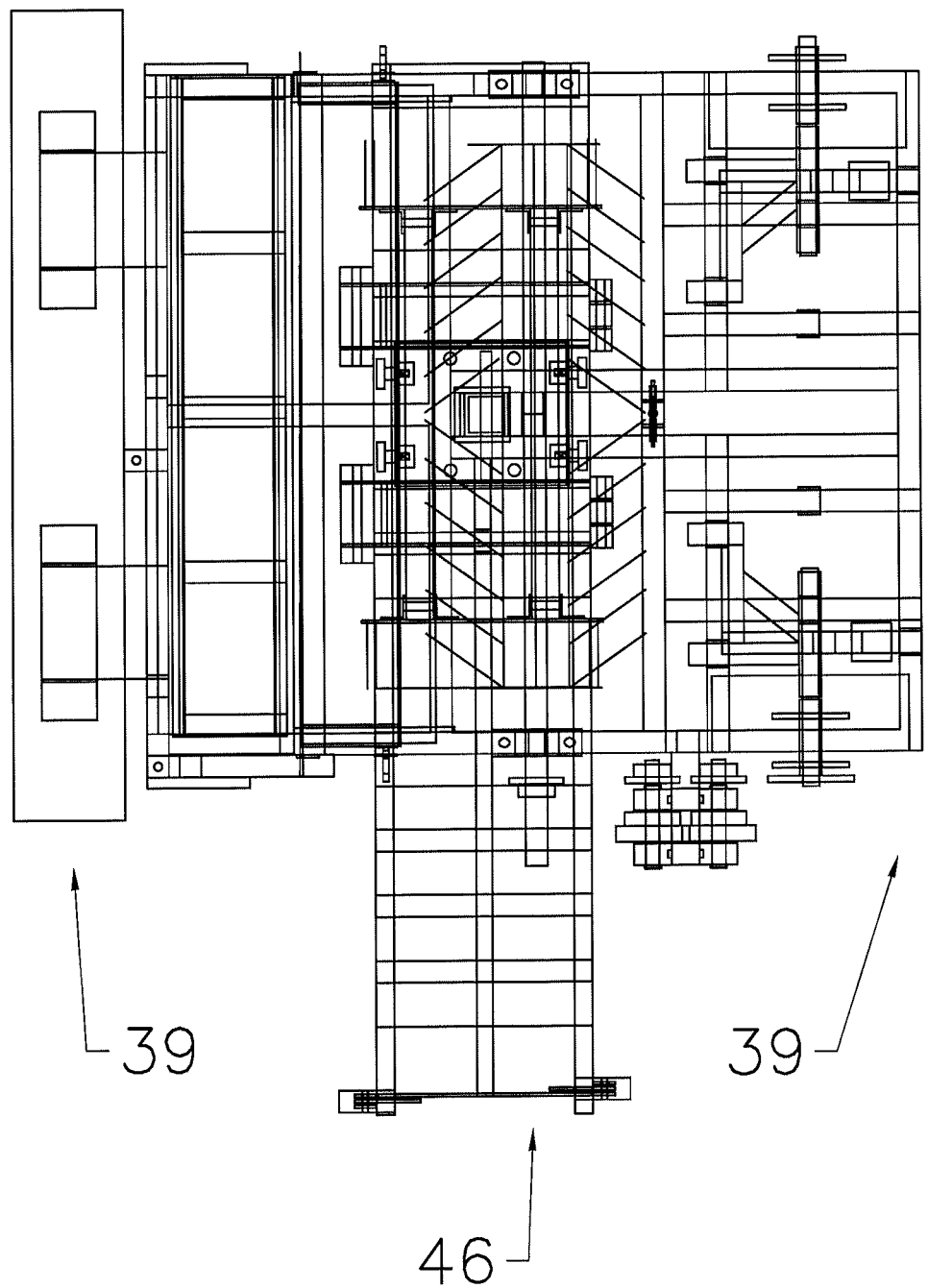
FIG. 7 is a top view of FIG. 6.
Figure 7A:
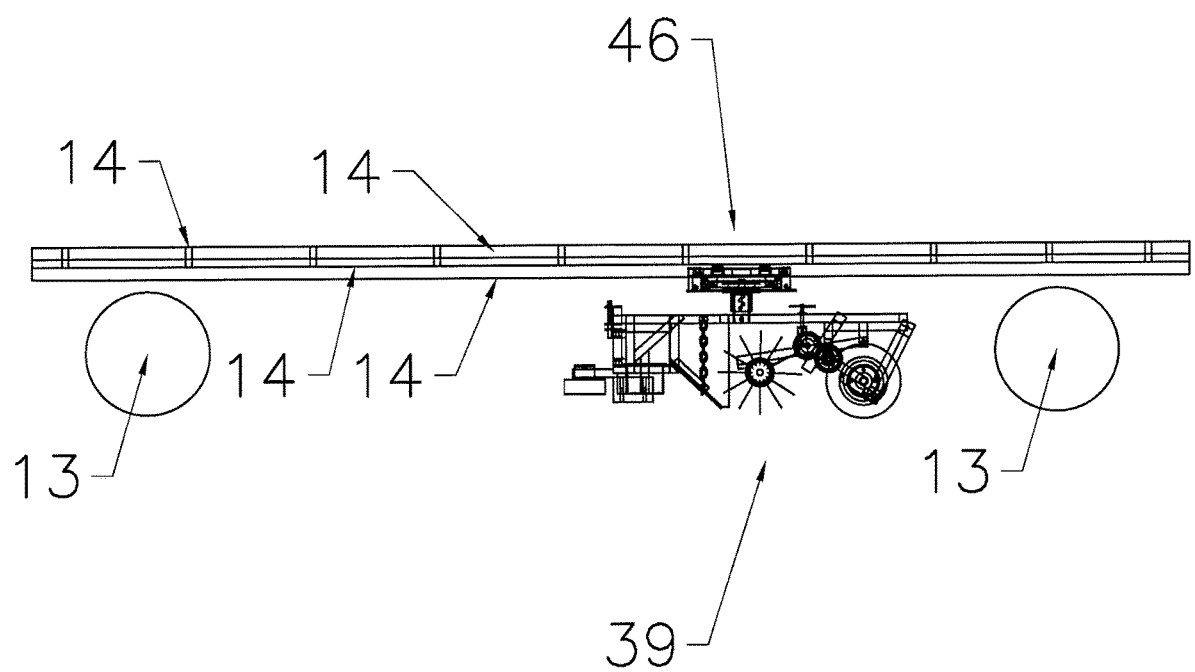
FIG. 7A is a side view of the existing GSE, the GSE wheel and axle, sweeping mechanism, assembly of communication element, support structure, and total cart assembly.
Figure 7B:
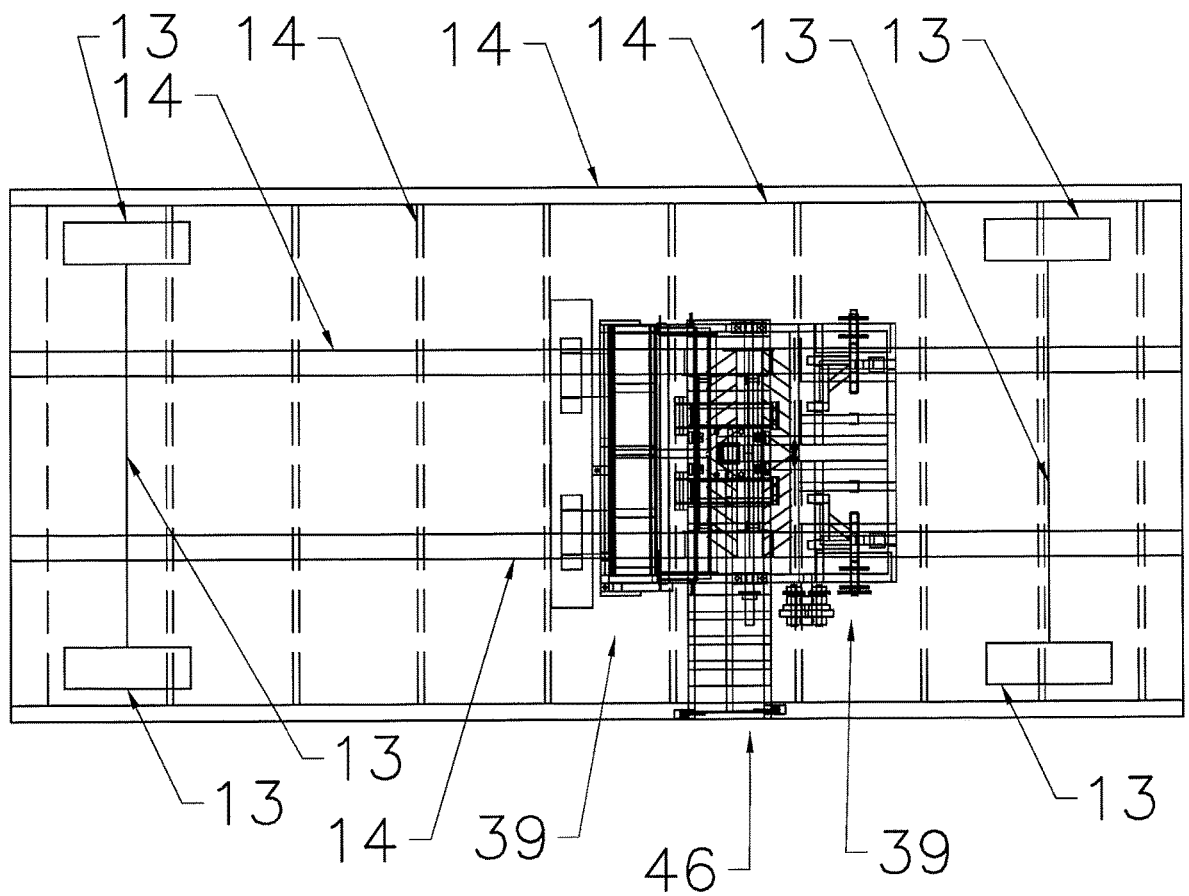
FIG. 7B is a top view of FIG. 7A.

Referring to FIG. 7, a mechanical sweeping mechanism is used for the collection of debris. Movement of a pre-existing vehicle rotates the independently suspended drive wheels. A system of gears/pulleys and chain/belts transmits the rotation of the drive wheels to power a cylindrical bristle, spinning in the opposite direction of travel. The bristle's height can be adjusted accordingly. Debris that is swept with the bristle system is contained within the confines of the mechanical sweeper with side curtains that directs debris up a ramp and into a collection hopper. The collection hopper is removable and the structure upon which the collection hopper rests can be rotated outside the mechanical sweeper's frame. A magnet and skid plate are also attached the collection hopper's rotatable structure. A hitch shank is pinned to the center and top of the mechanical sweepers frame and fits into the hitch receiver of the U-shaped cart like structure, above, that rides along the support structure 38.

In a preferred embodiment, the rigid components are fabricated of steel or other durable metal.

In a preferred embodiment, at least two rigid rails are deployed in parallel are fabricated of steel or other durable metal.

Other embodiments not disclosed in detail include: (1) modifying the linear rails 1 by rotating one or more of the linear rail cross members 2 along the axis of the linear rails 1; (2) framing linear rails 1 to provide additional strength and avoid breakage to the connections with linear rail cross members 2; (3) adding fixture points for additionally moveable linear rail cross-members 2; (4) application of the current invention to non-GSE vehicles by modifying communication elements to affix to standard vehicular undercarriages; (5) replacing pin-communication between GSE element and the present invention with a spring or dynamically adjustable height mechanism to compensate for height of GSE.

LEGEND

1. Rail, preferably linear
2. Cross Members
3. L Brackets/Tabs
4. Plate Blockers
5. Cart Like Structure
6. Track Rollers
7. Rigid Rod
8. Rigid Plate
9. Turntable, including top element 9A and a bottom element 9B,
10. Rigid sheet
11. Hitch Receiver
12. NOT USED
13. Existing GSE wheel and axle
14. Existing Vehicle Structure (GSE Baggage Cart)
15. Suspension System/Shocks
16. Drive Wheels
17. Mechanical Sweeper Frame
18. Gear/Pulley System
19. Cylindrical Bristle Sweeper
20. Bristle Height Adjustment
21. Curtain
22. Ramp
23. Chain
24. Collection Hopper
25. Rotatable Hopper Arm/Hinge
26. Magnet
27. Pinned Hitch Shank
28. Existing Vehicle Attachment (GSE Baggage Cart)
29. Existing Vehicle Attachment (GSE Baggage Cart)—Cross Member
30. NOT USED
31. Rigid tab support attachment
32. Female tab
33. Male
34. Skid-plate
35. Magnet Support
36. Spring Loaded Pin Hitch
37. Communication elements
38. Support structure
39. Sweeping mechanism
40. Total cart assembly
41. Trailing arm
42. Bristle support arm
43. Pivot joint
44. Ramp assembly
45. Ramp guides 46. An assembly of communication element 37, support structure 38, and total cart assembly 40.

Various other modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate embodiments also can be implemented in combination in a single embodiment. Conversely, various features that are described in the context of a single embodiment also can be implemented in multiple embodiments separately or in any suitable sub-combination.

Moreover, although features may be described above as acting in certain combinations and even initially claimed as such, one or more features from a claimed combination can in some cases be excised from the combination, and the claimed combination may be directed to a sub-combination or variation of a sub-combination.

What is claimed is:

1. A removable sweeper assembly capable of attachment to ground support equipment for removing foreign object debris from a planar surface, comprising
   at least one rigid linear rail,
   at least three linear rail cross-members,
      wherein at least two rigid rail cross-members communicate with a top surface of said at said least two rigid linear rails,
   at least two perpendicular rectangular rigid plate cross members,
   at least two cart-like structure plate-blockers,
   at least one communication element having a first end and a second end,
   at least one cart-like structure, said cart-like structure further comprising a vertical portion,
   at least one track roller,
      wherein said at least one track roller is rideably connected to said at least one rigid rail,
   at least one rigid rod,
   at least one rigid plate,
   at least one turntable, having a top element and a bottom element,
      wherein said top element and said bottom element communicate by ball bearings disposed therebetween,
   at least one rigid sheet,
   at least one hitch receiver,
   a sweeping mechanism,
   at least one wheel,
   a mechanical sweeper frame, having a first and a second end,
   a transmission means,
   a cylindrical bristle sweeper,
   a bristle height adjustment jack screw having a first end and a second end,
   a curtain,
   a ramp having a first end and a second end,
   at least one ramp guide,
   a chain having a first end and a second end,
   a collection hopper,
   a rotatable hopper arm,
   a trailing arm having a first end and a second end,
   a bristle support arm,
   at least one magnet,
   at least one magnet support,
   at least one hitch shank,
   at least one rigid tab support attachment,
   at least one male tab and at least one female tab,
   at least one shock absorber having a first end and a second end,
   at least one skid plate,
   at least one spring loaded pin hitch having a first end and a second end,
   a pivot joint,
   a communication element having a first end and a second end,
   at least one support structure having a first end and a second end;
   wherein a total cart subassembly comprises said at least one cart-like structure, said at least one track roller, said at least one rigid rod, said at least one rigid plate, said at least one turntable, said at least one rigid sheet, said at least one hitch receiver, and
   wherein a sweeper subassembly comprises said at least one shock absorber, said at least one drive wheel, said mechanical sweeper frame, said at least assembly, said cylindrical bristle sweeper, said bristle height adjustment jack screw, said curtain, said ramp, said chain, said collection hopper, said rotatable arm, said at least one magnet, said at least one magnet support, said at least one hitch shank, said at least one skid plate, said at least one spring loaded pin hitch, said trailing arm, said bristle support arm, said pivot joint, and said at least one ramp guide.

2. The removable sweeper assembly of claim 1, wherein said at least two rigid linear rails contain two slightly staggered slits, one on each of said at least two rigid linear rails.

3. The removable sweeper assembly of claim 1, wherein said like at least one cart-like structure further comprises four holes disposed thereupon including: two (2) holes on each side of each vertical portion of said at least one cart-like structure; and four track rollers are bolted to said four holes such that said at least one cart-like structure communicates with said sweeper attachment.

4. The removable sweeper assembly of claim 1, wherein said at least two rigid linear rails communicate with at least two steel L-brackets, wherein said at least two steel L-brackets are welded to at least one top portion of said at least three linear rail cross-members; and wherein said at least two steel L-brackets communicate with a GSE vehicle.

5. The removable sweeper assembly of claim 1, wherein said at least one cart-like structure may be a durable rigid linear cart-like structure.

6. The removable sweeper assembly of claim 1, wherein said at least one spring loaded pin hitch is a dynamic spring connection.

7. The removable sweeper assembly of claim 1, wherein said at least one rigid rail is linear.

8. The removable sweeper assembly of claim 7, wherein said linear at least one rigid rail is parallel to a second rigid rail.

9. The removable sweeper assembly of claim 1, wherein said at least one rigid rail is fabricated of steel.

10. The removable sweeper assembly of claim 1, wherein said transmission means comprises at least one gear assembly.

11. The removable sweeper assembly of claim 1, wherein said transmission means comprises at least one belt assembly.

12. The removable sweeper assembly of claim 1, wherein transmission means comprises at least one chain assembly.

\* \* \* \* \*